United States Patent
Allison

(10) Patent No.: US 11,788,521 B2
(45) Date of Patent: Oct. 17, 2023

(54) CENTRIFUGAL COMPRESSOR WITH PISTON INTENSIFIER

(71) Applicant: Southwest Research Institute, San Antonio, TX (US)

(72) Inventor: Timothy Charles Allison, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 374 days.

(21) Appl. No.: 16/833,608

(22) Filed: Mar. 29, 2020

(65) Prior Publication Data

US 2020/0325884 A1   Oct. 15, 2020

Related U.S. Application Data

(60) Provisional application No. 62/826,167, filed on Mar. 29, 2019.

(51) Int. Cl.
| | |
|---|---|
| *F04B 19/22* | (2006.01) |
| *F04B 23/14* | (2006.01) |
| *F04B 9/12* | (2006.01) |
| *F04B 39/00* | (2006.01) |

(Continued)

(52) U.S. Cl.
CPC ........ *F04B 39/0005* (2013.01); *F04B 39/062* (2013.01); *F04B 45/0533* (2013.01); *F17C 2221/012* (2013.01); *F17C 2221/013* (2013.01); *F17C 2221/014* (2013.01); *F17C 2221/017* (2013.01)

(58) Field of Classification Search
CPC .. F04B 19/22; F04B 23/14; F04B 9/12; F04B 9/129; F04B 9/131; F04B 9/133

USPC ................ 417/225, 206, 375–409, 244–268
See application file for complete search history.

(56) References Cited

U.S. PATENT DOCUMENTS 2,995,292 A * 8/1961 Fleming .................... F15B 3/00
                                                                417/225
3,531,973 A * 10/1970 Bickley .................... B21J 13/04
                                                                100/214

(Continued)

FOREIGN PATENT DOCUMENTS

| DE | 2624229 A1 * | 12/1976 | ............. F04B 9/133 |
| WO | WO 8802818 A1 * | 4/1988 | ............. F04B 9/133 |

OTHER PUBLICATIONS

Machine Translation of DE 2624229 to Wood retreived from espacenet on Jul. 22, 2022 (Year: 2022).*

*Primary Examiner* — Philip E Stimpert
*Assistant Examiner* — Dnyanesh G Kasture
(74) *Attorney, Agent, or Firm* — Livingston Law Firm

(57) ABSTRACT

A compressor system for receiving a gas fluid and discharging the gas fluid at a higher pressure. The system comprises at least one compressor and at least one piston intensifier associated with each compressor. Each piston intensifier has a double-acting piston, with one piston head reciprocating in an actuation cavity and the other piston head reciprocating in a high pressure cavity. The compressor delivers its output flow to both cavities of the piston intensifier, alternating between below and above their piston heads, to provide both a working (actuation) fluid and a fluid to be compressed and discharged. A return flow from the actuation cavity back to the compressor also alternates to recycle the working fluid.

7 Claims, 2 Drawing Sheets

(51) Int. Cl.
*F04B 39/06* (2006.01)
*F04B 45/053* (2006.01)

(56) References Cited

U.S. PATENT DOCUMENTS

| | | | |
|---|---|---|---|
| 6,755,225 B1* | 6/2004 | Niedwiecki | F17C 5/007 |
| | | | 141/2 |
| 7,194,853 B1* | 3/2007 | Knight | F02K 9/46 |
| | | | 417/393 |
| 2006/0024180 A1* | 2/2006 | Lane | F04B 9/133 |
| | | | 417/415 |
| 2006/0071016 A1* | 4/2006 | Diggins | F17C 7/02 |
| | | | 222/3 |
| 2011/0131966 A1* | 6/2011 | McBride | F04B 17/03 |
| | | | 60/415 |
| 2014/0261328 A1* | 9/2014 | McAlister | F02M 67/04 |
| | | | 123/446 |

* cited by examiner

| 6-8 STAGE CENTRIFUGAL COMPRESSOR | | PISTON INTENSIFIER | |
|---|---|---|---|
| PARAMETER | VALUE | PARAMETER | VALUE |
| INLET PRESSURE, bara | 10.0 | STAGE 1/2 DISCHARGE PRESSURES, bara | 145/530 |
| INLET TEMPERATURE, °C | 20.0 | STAGE 1/2 DISCHARGE TEMPERATURE, °C | 158 |
| DISCHARGE PRESSURE, bara | 40.0 | DISCHARGE MASS FLOW, kg/hr | 400 |
| MAXIMUM STAGE DISCHARGE TEMPERATURE, °C | 114.6 | ACTUATION MASS FLOW, kg/hr | 3069 |
| MASS FLOW, kg/hr | 3469 | STAGE 1/2 HP PISTON DIAMETER, mm | 300/100 |
| POWER, MW | 2.33-2.73[1] | STAGE 1/2 ACTUATION PISTON DIAMETER, mm | 636/209 |
| IMPELLER TIP DIAMETER, mm | 61.6 | STROKE, mm | 500-1000 |
| TIP SPEED, m/s | 700 | SPEED, CYCLES PER MINUTE | 18-35[2] |
| MINIMUM FLOW COEFFICIENT | 0.015 | MAXIMUM PISTON VELOCITY, m/s | 0.950 |

FIG. 2

CENTRIFUGAL COMPRESSOR WITH PISTON INTENSIFIER

BENEFIT OF PROVISIONAL FILING DATE

This patent application claims the benefit of the filing date, Mar. 29, 2019, of U.S. Provisional Patent Ser. No. 62/826,167, entitled "Centrifugal Compressor with Piston Intensifier".

TECHNICAL FIELD OF THE INVENTION

This invention relates to centrifugal compressor systems, and more particularly to centrifugal compressor systems for high-pressure ratio applications.

BACKGROUND OF THE INVENTION

A Hydrogen Refueling Station (HRS) is an infrastructure designed for filling a vehicle with hydrogen fuel. The HRS can be part of a production unit where hydrogen is produced or can be remote from production. If the hydrogen is produced on site or is delivered to the station at an intermediary pressure or in liquid state, the HRS requires intermediary storage and a compression system.

The compression system must be capable of bringing the hydrogen to a desired gas pressure level. Compression is used to overcome the pressure difference between storage pressure (typically in a range of 50 to 200 bar) and refueling pressure (up to 1,000 bar). The refueling process should not exceed a short target time of as little as three to five minutes. Because the vehicle's fuel cell is operated with pure hydrogen, it is important that no contamination with lubricants occurs during compression.

Currently available compressors fail to meet the order-of-magnitude higher dispensing needs of heavy-duty (HD) applications and are not designed to scale reliably or cost-effectively. Hydrogen Refueling Station (HRS) compressors have fundamentally different needs and requirements than traditional hydrogen applications, and therefore compression systems should be designed to be fit for purpose.

Existing compression technologies include reciprocating and hydraulic piston compressors that suffer from low reliability and extremely short maintenance intervals due to wear of oil-free components and oil isolation seals required to meet high hydrogen purity requirements. Diaphragm compressors are hermetically sealed but have demonstrated notable diaphragm degradation due to hydrogen chemical attacks and physical damage arising from rapidly changing air bubble solubility of the hydraulic fluid caused by on-off cycling. In addition to reliability concerns, a major challenge with conventional technologies is the ability to scale to the high-throughput requirements for HD refueling with low suction pressures, which would require massive pistons or diaphragm heads. The scaling of existing technologies is not a trivial or even necessarily logical approach to meet the needs of the HD market.

Centrifugal compressors are typically a reliable technology of choice for high-flow high-pressure (HP) process applications, but the HP ratio of a refueling compressor for an integrated production-storage-refueling system presents significant challenges. Due to hydrogen's very low molecular weight, typical compressor impeller tip speeds up to 400 m/s would require nearly 50 stages of compression. Low volume flow rates at the final stages would result in stage designs with low efficiency and manufacturing challenges due to small flow passage sizes.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 illustrates example specifications for a compressor system having 6-8 stages.

SUMMARY

Figure 1:
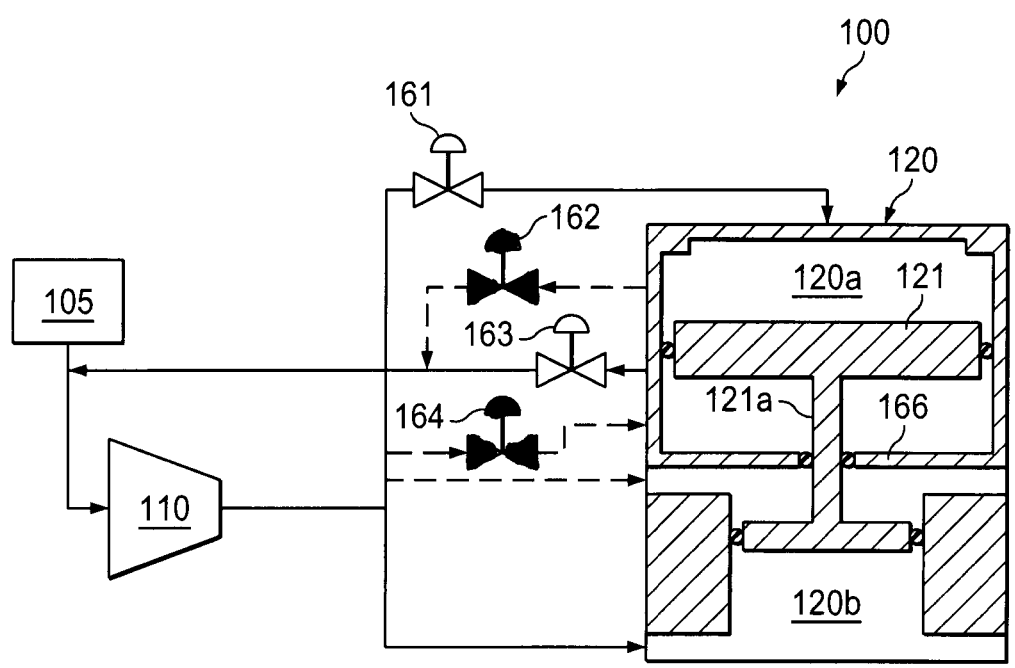
FIG. 1 illustrates one stage of the compressor system.

The following description is of gas compression system that comprises a centrifugal compressor in fluid connection in series with a piston intensifier. Fluid flow from the centrifugal compressor is provided to the piston intensifier. The centrifugal compressor drives the piston intensifier to raise the pressure of the fluid, using at least a portion of the fluid from the centrifugal compressor as the working fluid for the piston intensifier. At least a portion of the remaining portion of fluid from the centrifugal compressor is provided to the intensifier compressor as the fluid being compressed to the desired pressure. That is, the fluid flow output from the centrifugal compressor is divided into at least two inputs to the intensifier: (1) as working fluid and (2) as the fluid being compressed.

The description is also of methods for compressing a fluid using a fluid compression system comprising a centrifugal compressor and a piston intensifier. One exemplary method includes providing a fluid to a centrifugal compressor, operating the centrifugal compressor to compress the fluid and to provide a first compressed fluid as an output fluid flow, providing at least a first portion of the output fluid flow of the centrifugal compressor as a working fluid to an intensifier to drive at least a portion of the compression operation by the intensifier, providing a second portion of the output fluid flow of the centrifugal compressor as a production fluid to the intensifier, said production fluid to be compressed by the compression operation of the intensifier driven at least by the working fluid from the output fluid flow of the centrifugal compressor, providing at least a portion of the compressed production fluid as an output fluid flow from the intensifier at a pressure higher than the pressure of the first compressed fluid, and recycling at least a portion of the working fluid back to the centrifugal compressor for continued use as the working fluid.

DETAILED DESCRIPTION OF THE INVENTION

The following description is directed to a compressor system for high pressure ratio gas compression applications. Although this description is written in terms of hydrogen refueling applications, the compressor system may also be used with other gasses, such as helium, natural gas, air, nitrogen, carbon dioxide. Many other applications are possible for transferring gas from a source at one pressure to a destination at a higher pressure. The compression system is compact and scalable for various applications.

One application is for high-throughput hydrogen fueling for medium and heavy-duty transportation. The system has application at both refueling stations and production sites that distribute to refueling sites. The compression system may be used to fill vehicles (on board storage) or to fill intermediate storage.

FIG. 1 illustrates a compression system 100 in accordance with the invention. The compression system 100 combines a centrifugal compressor 110 with a two-stage hermetically-sealed piston intensifier 120 for reliably delivering hydrogen or other gasses at high pressures.

Only one stage is shown in FIG. 1; various applications of the system may call for multiple stages. A typical implementation for hydrogen fueling might be two double-acting piston intensifiers 120 for every compressor 110. Depending on the application, other configurations are possible.

Compressor system 100 is capable of delivering gas at 400 kg/hr or more at pressures of 530 bar or more. The system may be described as a high-pressure ratio and low flow system. For purposes of example, the system described herein operates with a pressure ratio of 53:1 and flow of 400 kg/hr.

The piston intensifier 120 enables a high system pressure ratio by using excess process gas flow from the centrifugal compressor 110 as a motive fluid, thus eliminating concerns of leakage or contamination from liquid or pneumatic piston concepts. This solution also offers improved reliability over existing compressor solutions by reducing the dynamic stresses associated with high-speed reciprocating equipment.

The piston intensifier 120 comprises a double-headed piston 121, having two piston heads and a piston shaft. Each piston head pressurizes an associated compression cavity. An actuation piston head reciprocates within an actuation cavity 120a. A high pressure piston head reciprocates within a high pressure cavity 120b. In the example of FIG. 1, the actuation cavity 120a (and its actuation head) are larger than the high pressure cavity 120b (and its high pressure piston head).

The two cavities 120a and 120b have no fluid communication, which allows them to achieve different pressures. In the example of FIG. 1, the two cavities are integrated into a cylinder 160 with a separation barrier 166 between them. The piston shaft 121a is allowed to reciprocate through a sealed hole in the center of this barrier 166.

Compressor 110 is a high-flow centrifugal compressor that receives gas from a source 105. Compressor 110 simultaneously provides both pre-compression of the supply gas and actuation gas for the piston intensifier 120. This configuration is advantageous over traditional reciprocating or diaphragm compressor solutions as well as conventional centrifugal-only compressor solutions in that it (a) minimizes leakage to atmosphere via low-leakage dry gas seals on the centrifugal compressor and a hermetically-sealed intensifier, (b) eliminates the risk of contamination in the intensifier via hydrogen motive gas, (c) maximizes system reliability by relaxing piston seal leakage requirements and leveraging proven centrifugal compressor technology including recent advancements for hydrogen service, (d) minimizes compression power through intercooling between compressor and intensifier stages, and (e) enables near-isentropic efficiency in the intensifier cylinders via slow piston speeds and minimal clearance volumes.

In the example of FIG. 1, compressor 110 has an inlet pressure of 10 bar and delivers hydrogen to the piston intensifier 120 at 40 bar. This inlet pressure is typical of today's hydrogen production systems, also some production may discharge at slightly lower pressures. Other pressures and pressure differentials may be used.

The compressor suction and discharge lines are connected to the piston intensifier 120, which uses the 4:1 pressure ratio and approximately 90% of the mass flow produced by the compressor 110 to drive a piston intensifier 120. In the two-stage example of this description, the compressor output is delivered to both stages, with only one stage being explicitly illustrated.

The piston intensifier 120 delivers the remaining 10% of the flow (at 400 kg/hr) to 530 bar storage. The 530-bar discharge pressure is for purposes of example—actual target discharge pressures may vary depending on the application.

At least one shaft end seal on the drive end is necessary as the required motor power and compressor speed exceed the existing capacity of high-speed motors. However, the design may potentially incorporate gas film bearings to improve compactness, eliminate a lubrication oil system, and eliminate the non-drive-end shaft seal. Gas film bearings have been evaluated in demonstrated high load capacities at elevated pressures, with test experience for both journal and thrust gas bearings at pressures up to 70 bar.

The piston motion of piston intensifier 120 is controlled through actuated valves that alternately connect the inboard and outboard cylinders to the centrifugal compressor suction and discharge lines. Proper timing of the piston motion is managed using the valves shown in FIG. 1.

As indicated by the different valve shadings in FIG. 1, the valves 161-164 alternate their open/closed states for the double acting actuation of the actuation piston head. In other words, the non-shaded valves 161 and 163 are open while the shaded valves 162 and 164 are closed, and vice versa. The supply lines to and from the piston shown as solid lines are open while the supply lines shown as dashed lines are closed, and vice versa. Flow to and from the high-pressure cavity 120b is controlled by check valves (not shown).

Referring to the example of FIG. 1, hydrogen exits a source system at 10 bar pressure. It enters via the inlet line of the centrifugal compressor at 10 bar and exits at approximately 4000 kg/hr at 40 bar. Ten percent (10%) of the 40 bar hydrogen enters the piston intensifier to be compressed. The remaining 90% of flow is diverted through a working fluid loop to drive the pistons. This diverted flow operates in alternating cycles through each side of the working cavity of the piston 121. Actuation of control valves 161-164 on each side of the working (actuation) cavity effectively swaps the high-pressure and low-pressure sides of the working cavity to drive the piston. Proper timing of the piston motion will be managed via the valves.

Expended working fluid will route back to the 10 bar line of the to be recycled back into the centrifugal compressor. The 10% of fluid flow that is used for production fluid enters the high-pressure cavity 120b to be compressed by the action of the working fluid controlled by the actuating control valves. While this system is designed for 10 bar inlet pressure and 530 bar outlet pressure, the discharge pressure can be controlled downward by opening a discharge valve on the piston intensifier 120 at a lower pressure.

Although initial sizing was performed with a two-stage piston intensifier, additional stages will allow intercooling and may reduce net system power. The operating speed and surface velocity across the intensifier will depend upon the final sizing, but preliminary results shown in FIG. 2 indicate that a 50 mm HP piston diameter (273 mm actuation piston diameter) keeps the peak surface velocity below a conventional 1.0 m/s limit of existing rod and piston seals at the predicted discharge temperatures below 160° C.

The centrifugal compressor design target may be implemented at commercial technology limits for gearbox speed ratios, impeller tip speeds, and shaft end seal speeds in order to minimize overall system size and cost. Detailed design, analysis, and materials selection are required to ensure an efficient and reliable system including assessment of rotor dynamics of the high stage count rotor and aerodynamics to maintain efficiency in the latter stages with low flow coefficients. The intensifier design calls for seal selection and optimization to minimize size via increasing operating speed (within rod seal surface speed limits). Transient performance of the coupled centrifugal-intensifier system may be analyzed via simulations and prototype testing.

Design work includes design for the full-scale system and detailed design for reduced-scale test prototypes that target specific technology gaps identified for the full-scale system. Design of the full-scale system includes one-dimensional aerodynamic design and rotor dynamic analysis of the compressor and pressure vessel design to develop detailed two-dimensional layouts of the compressor and piston intensifier. Component (couplings, bearings, seals, valves, gearbox, motors, etc.) selection ensures design compatibility with existing commercial technologies and to support full system cost models.

A dynamic model of the piston intensifier coupled with the centrifugal compressor may be used to advance and optimize the piston design and valve timing and avoid unacceptable system dynamics (e.g., compressor surge) during operation. Detailed design of the reduced-scale test prototypes will include three-dimensional flow path designs for the compressor stage, including computational fluid dynamic and finite element analyses of the critical machine components.

The stop/start sequence of the compressor system may be designed for the duty cycles expected at hydrogen refueling stations. An example is to startup the centrifugal compressor in recycle, transition to the first stage piston in recycle, and then bring the final stage piston online. Centrifugal compressors can be designed for a very large number of starts/stops. With regard to the piston, the use of hydrogen as both actuation and process fluid allows large seal clearances and/or hydrostatic bearings to minimize wear.

The compressor system is easily scaled up to increase throughput. The centrifugal compressor is scaled by increasing the (currently small) flow coefficients for each stage. One alternative for scale-up of the piston intensifier is to use additional piston intensifiers in parallel.

A feature of the invention is the positive displacement geometry of the piston intensifier. The piston intensifier uses gas in both pistons, thus using gas for both actuation and process. This allows them to use higher leakage non-contacting piston seals and/or hydrostatic bearings to minimize piston/seal wear.

FIG. 2 and Table 1 set out examples of sizing and performance specifications for a 6-8 stage centrifugal compressor system with two piston stages. As stated above, the number and specifications of centrifugal and piston stages may vary depending on the application.

It may be noted that values for compressor power are affected by intercooling configurations, with more intercooling resulting in less power. For piston speeds, the maximum speed occurs at minimum stroke.

For the centrifugal compressor:

| | |
|---|---|
| Inlet pressure (bara) | 10.0 |
| Inlet temperature (degrees C.) | 20.0 |
| Discharge pressure (bara) | 40.0 |
| Maximum stage discharge temperature (degrees C.) | 114.6 |
| Mass flow (kg/hr) | 3469 |
| Power (MW) | 2.33-2.73 |
| Impeller tip diameter (mm) | 61.6 |
| Tip speed (m/s) | 700 |
| Minimum flow coefficient | 0.015 |

For the piston intensifier:

| | |
|---|---|
| Stage ½ discharge pressures (bara) | 145/530 |
| Stage ½ discharge temperature (degrees C.) | 158 |
| Discharge mass flow (kg/hr) | 400 |
| Actuation mass flow (kg/hr) | 3069 |
| Stage ½ HP piston diameter (mm) | 300/100 |
| Stage ½ Acutation piston diameter (mm) | 636/209 |
| Stroke (mm) | 500-100 |
| Speed (cycles per minute) | 18-35 |
| Maximum piston velocity (m/s) | 0.950 |

The invention claimed is:

1. A compressor system for receiving a gas fluid from a source and for discharging the gas fluid at a higher pressure, comprising:
  a centrifugal compressor that receives the gas fluid from the source via a suction line at a compressor input pressure and discharges the gas fluid via a discharge line at a compressor output pressure;
  at least one piston intensifier in series fluid connection with the compressor, the piston intensifier operable to use a larger portion of the gas fluid from the compressor as its working fluid and to discharge a smaller portion of the gas fluid at a higher pressure than the compressor output pressure;
  wherein the piston intensifier comprises a double-acting piston having an actuation head and a high pressure head;
  wherein the piston intensifier further comprises an actuation cavity within which the actuation head reciprocates and a high pressure cavity within which the high pressure head reciprocates;
  wherein both the actuation cavity and the high-pressure cavity have above-piston and below-piston regions;
  wherein the compressor discharge line is in fluid communication with the above-piston and below-piston regions of both the actuation cavity and the high-pressure cavity;
  a first actuation input valve in the discharge line to the above-piston region of the actuation cavity
  a second actuation input valve in the discharge line to the below-piston region of the actuation cavity
  wherein the first and second actuation input valves are operable to open and close in an alternating sequence;
  wherein the actuation cavity has a first return line from the above-piston region back to the suction line and a second return line from the below-piston region back to the suction line;
  a first actuation return valve on the first return line;
  a second actuation return valve on the second return line;
  wherein the first and second actuation return valves are operable to open and close in an alternating sequence, such that the first actuation input valve and second actuation return valve are open at the same time and closed at the same time;
  wherein the piston intensifier is operable to receive the larger portion of gas directly from the compressor into the actuation cavity via the discharge line and first and second actuation input valves, and further operable to receive the smaller portion of gas into the high pressure cavity directly from the compressor via the discharge line, and is further operable to return the larger portion of gas back to the suction line via the first return line and second return line to be recycled as working fluid for the piston intensifier, and is further operable to discharge the smaller portion of gas as high pressure gas to a high pressure destination external to the compressor system.

2. The compressor system of claim 1, wherein the actuation cavity and the high-pressure cavity are integrated into a single cylinder, the cylinder having a barrier that provides a sealed separation between them and has a hole for allowing a shaft to reciprocate within the actuation cavity and the high-pressure cavity respectively.

3. The compressor system of claim 1, wherein the fluid is one or more of the following gases or a mixture containing one or more of the following gases: hydrogen, helium, natural gas, air, nitrogen, or carbon dioxide.

4. The compressor system of claim 1, wherein the compressor system has multiple compressors and at least one piston intensifier associated with each of said multiple compressors.

5. The compressor system of claim 1, wherein the compressor system has two or more piston intensifiers associated with each compressor of said at least one compressor.

6. The compressor system of claim 1, wherein the ratio of input pressure to the compressor and output pressure from the high pressure cavity is at least 1:53.

7. The compressor system of claim 1, wherein the output flow from the piston intensifier is at least 400 kilograms per hour.

* * * * *